United States Patent [19]

Delgado

[11] Patent Number: 5,368,644
[45] Date of Patent: Nov. 29, 1994

[54] MECHANICAL SOLUTION APPLICATING DEVICE AND METHOD FOR CLEANING AND/OR LUBRICATING RAW STOCK MATERIAL

[76] Inventor: Cruz Delgado, 3205 Madison Ave., Unit 22, Bridgeport, Conn. 06606

[21] Appl. No.: 67,222

[22] Filed: May 26, 1993

[51] Int. Cl.$^5$ .................................. B05C 3/02
[52] U.S. Cl. ..................... 118/405; 118/123; 118/125; 118/419; 118/420; 118/424; 118/427; 118/DIG. 19
[58] Field of Search ............... 118/123, 125, 404, 405, 118/420, 424, 427, 419, DIG. 19, DIG. 12, DIG. 18

[56] References Cited

U.S. PATENT DOCUMENTS

| | | | |
|---|---|---|---|
| 1,153,244 | 9/1915 | Nivling | 118/420 |
| 1,726,623 | 9/1929 | Hollnagel | 118/420 X |
| 1,734,737 | 11/1929 | Martindell | 118/420 X |
| 1,883,155 | 10/1932 | Watson | 118/420 X |
| 2,878,778 | 3/1959 | Kusters | 118/419 X |
| 2,906,018 | 9/1959 | Baker | 118/424 X |
| 3,112,226 | 11/1963 | St. Jean | 118/125 X |
| 3,272,176 | 9/1966 | Saydlowski | 118/419 X |
| 3,449,156 | 6/1969 | Brown | 118/419 X |
| 3,460,978 | 8/1969 | Clayton et al. | 118/419 X |
| 3,499,418 | 3/1970 | Mayhew | 118/419 X |
| 3,783,972 | 1/1974 | Molstad | 184/15 R |
| 3,890,927 | 6/1975 | Hunter | 118/419 |
| 4,275,098 | 6/1981 | Gunji et al. | 118/424 X |
| 4,336,866 | 6/1982 | Blanton, Jr. | 184/15 R |
| 4,498,558 | 2/1985 | Bendaham | 184/15.1 |
| 4,643,126 | 2/1987 | Wilkinson et al. | 118/405 |
| 4,685,416 | 8/1989 | Olivares | 118/125 |
| 4,688,515 | 8/1989 | Rosebrooks | 118/405 |
| 4,862,996 | 9/1989 | Chisholm | 184/15.1 |
| 5,186,279 | 2/1993 | Chasteen et al. | 184/15.1 |
| 5,186,751 | 2/1993 | Moore | 118/109 |

*Primary Examiner*—James C. Housel
*Assistant Examiner*—Harold Y. Pyon
*Attorney, Agent, or Firm*—Arthur T. Fattibene; Paul A. Fattibene

[57] ABSTRACT

This invention relates to a mechanical solution applicating device and method for cleaning and/or lubricating a raw stock material as it is being fed to a production machine or station. The applicating device is in the form of a holding tank having a reservoir portion for containing a supply of treating solution. Disposed within the reservoir portion and separated from the treating solution is a bathing tank through which the raw stock material is fed and treated. The feed of the raw stock material is utilized to effect rotation of a scoop wheel which scoops the treating solution out of the reservoir portion and into the bathing tank where the raw stock material is bathed or coated with the treating solution as it is fed therethrough. The rotation of the scoop wheel is effected by a driving wheel journaled thereto disposed in driving relationship with the raw stock material being fed through the bathing tank. Suitable guide means are provided in the opposed walls of the respective tank to guide the raw stock material therethrough. Downstreamwise from the reservoir portion of the holding tank is a wiper for removing any excess treating solution from the stock raw material prior to the processing thereof.

8 Claims, 2 Drawing Sheets

MECHANICAL SOLUTION APPLICATING DEVICE AND METHOD FOR CLEANING AND/OR LUBRICATING RAW STOCK MATERIAL

FIELD OF THE INVENTION

This invention is directed to a solution applicating device and method, and more particularly to a mechanically actuated solution applicating device and method for clearing and/or lubricating a continuous strip of raw stock material as it is being fed to a processing station.

PRIOR ART

The feeding of raw stock material into a processing machine or station for fabricating various parts therefrom generally required the raw stock to be cleaned and/or lubricated prior to processing. Heretofore, such treatment solution, be it a cleaner or a lubricant, was applied to the raw stock material by manual brushing, dripping and/or spraying the raw stock with the appropriate treating solution. These prior known methods of cleaning and/or lubricating raw stock material was often tedious, time consuming and presented hazardous conditions, as such treating solution invariably drips onto the surrounding floor area of the machine to create a serious safety hazard, thereby consuming additional unnecessary man hours of clean up time upon the completion of an operation and/or a working shift. These known methods of applying the treating solution frequently do not result in adequate cleaning and/or lubrication which can result in improper parts being fabricated because of insufficient cleaning and/or lubrication. In such event, the tool life of the processing machine can be materially lessened.

U.S. Pat. Nos. 3,783,972; 4,336,866; 4,498,558; and 4,862,996 disclose various wire rope type of lubricating devices to lubricate and/or clean wire cable in place, such for bridge suspension cables, well operating suspension cables and heavy duty crane cables. U.S. Pat. No. 3,710,758 discloses a conveyor type treating machine for applying various materials to various shapes and sizes of articles.

OBJECT OF THE INVENTION

An object of this invention is to provide for a relatively simple and positive acting mechanical solution applicating device and method for cleaning and/or lubricating a raw stock material as it is being fed or advanced to a processing machine or station by which the raw stock material is uniformly cleaned and/or lubricated in a manner wherein the treating solution is positively confined to eliminate any resulting hazardous or unsafe condition heretofore caused by the treating solution dripping onto the surrounding floor area.

Another object is to provide a mechanical solution applicating device and method which does not require an external power source to operate the same.

SUMMARY OF THE INVENTION

The foregoing objects and other features and advantages are attained by a holding tank for containing a supply of treating solution for cleaning and/or lubricating a raw stock material as it is being fed to a processing station. Supported within the holding tank is a bathing tank that is separated from the supply of treating solution within the holding tank; and which tanks are disposed in line with the processing machine or station. Guides are provided for guiding the raw stock material through the opposed walls of the respective tanks. Rotatably journaled within the holding tank and adjacent to the bathing tank is a scoop wheel having a plurality of circumferentially spaced scoops thereon. The arrangement is such that as the scoop wheel is rotated, the scoops thereon will sequentially lift a predetermined amount of treating solution from the supply in the holding tank and empty the same into a bathing tank. The drive of the scoop wheel is effective by a drive wheel connected to the scoop wheel and which drive wheel is driven by the raw stock material being fed through the bathing tank. A resilient biasing member is provided to maintain the raw stock material in a positive driving relationship with the drive wheel of the scoop wheel. A wiper is provided downstreamwise of the bathing tank to remove any excess of the treating solution from the raw stock material prior to processing.

IN THE DRAWINGS

DETAILED DESCRIPTION OF THE INVENTION

Figure 1:
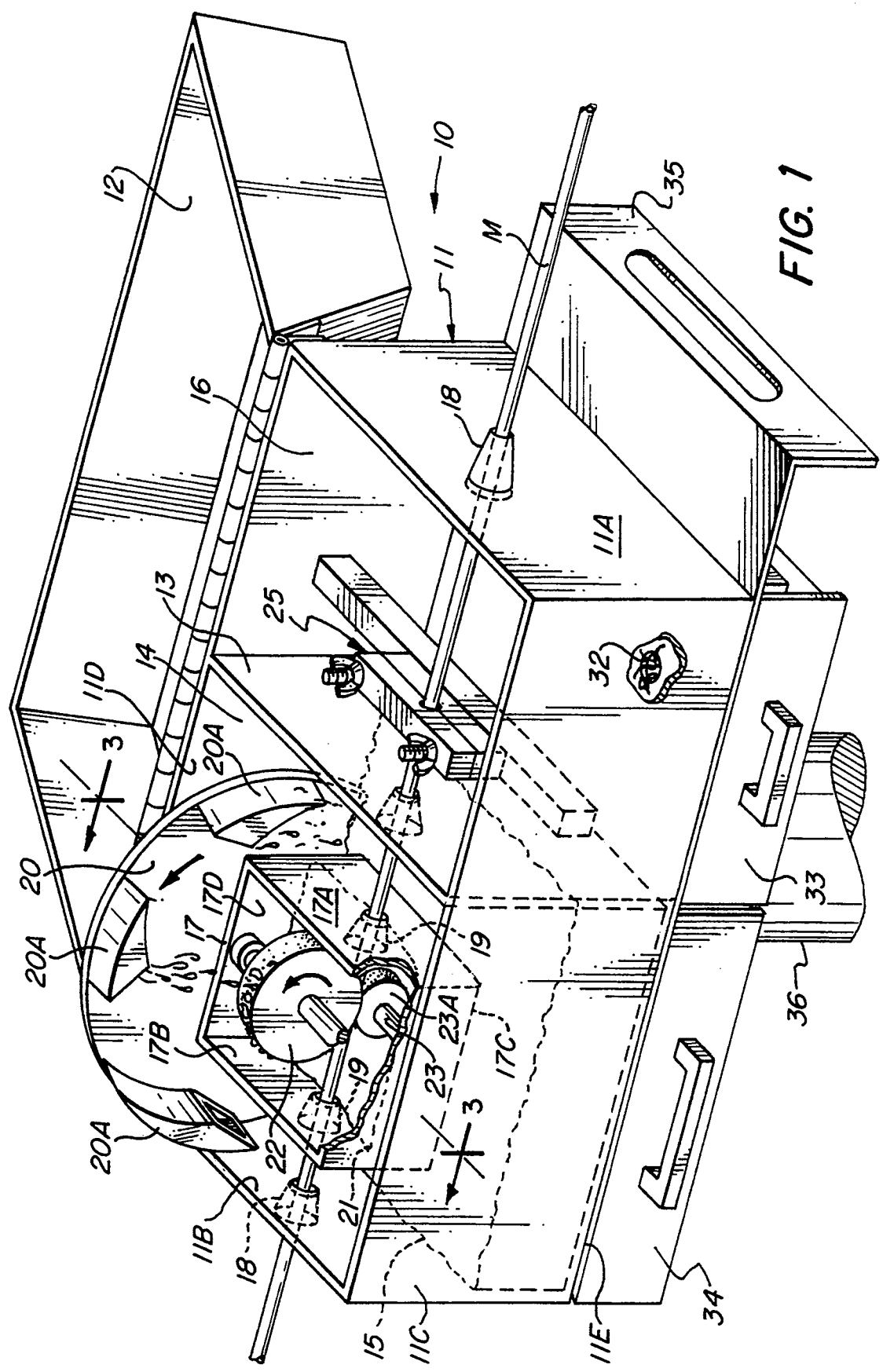
FIG. 1 is a perspective view of a mechanical solution applicating device embodying the present invention.
Figure 2:
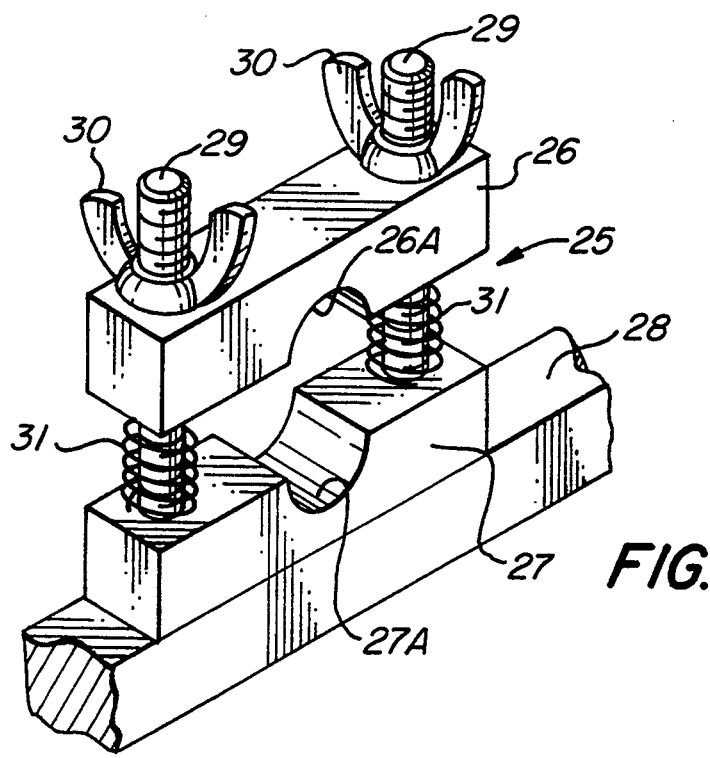
FIG. 2 is a detail perspective view of the wiper assembly.
Figure 3:
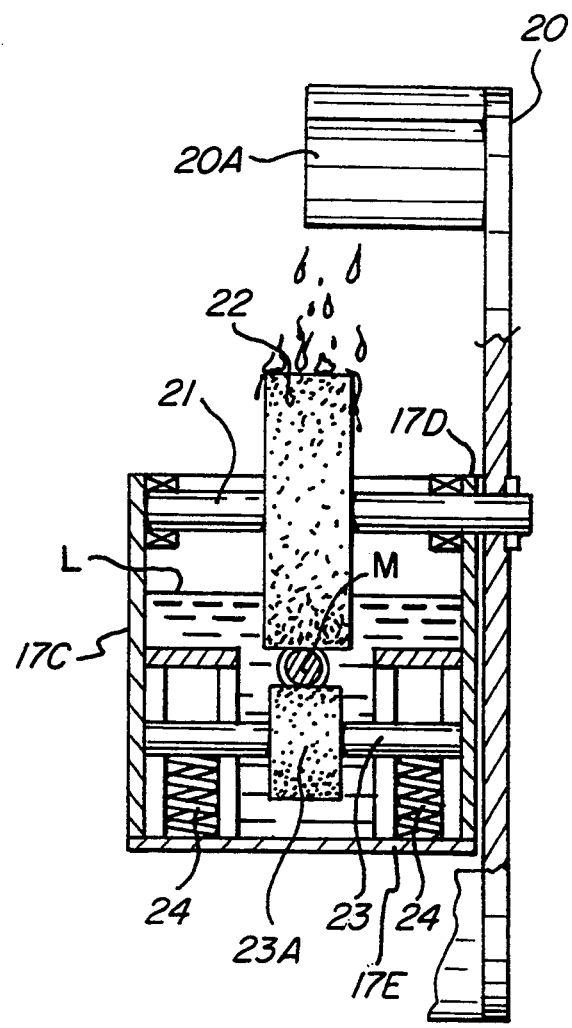
FIG. 3 is a section view taken along line 3—3 on FIG. 1.

Referring to the drawings, there is shown a mechanical solution applicating device 10 for cleaning and/or lubricating a raw stock material M. The treating solution as used herein is defined as any cleaning, lubricating or other material by which the raw stock material M is required to be treated prior to being processed. It will also be understood that if successive cleaning and lubrication operations of the raw stock material M is required, similarly constructed applicating devices 10 as herein described may be disposed in tandem and in line with the processing machine or station (not shown) for processing the cleaning and lubrication of the raw stock material M in successive operations.

The mechanical solution applicating device 10, illustrated in FIG. 1, comprises a holding tank 11 having opposed end walls 11A, 11B interconnected between opposed side walls 11C, 11D and closed by a bottom wall 11E. If desired, a hinged cover 12 may be provided for closing the open end of the holding tank 11.

Extending transversely between the opposed side walls 11C and lid of the holding tank 11 is a partition 13 for dividing the holding tank 11 into a reservoir portion 14 adapted to contain a suitable supply of a treating solution 15, and a wiper portion 16. Disposed within the reservoir portion 14 of the holding tank 11 is a bathing tank 17 which is spaced from and separated from the treating solution 15. The bathing tank is defined as a rectangular tank having opposed end walls 17A, 17B and side walls 17C, 17D closed by a bottom wall 17E. As shown, the respective end walls 11A, 11B of the holding tank 11 and the end walls 17A, 17B of the bathing tank 17 are provided with in line guides 18 and 19 respectively for receiving and guiding the raw stock material M therethrough. The partition 13 may also be provided with a suitable guide or opening through which the raw stock moves. In the illustrated embodiment, the raw stock material M is shown as a continuous wire which is to be processed. However, it will be understood that the raw stock material M may comprise any continuous plate, bar, or other shaped raw stock material that is required to be cleaned and/or lubricated prior to processing. The raw stock material M is fed to the processing station by a suitable drive (not shown) where it is processed into some finished article.

Rotatably journaled within the holding tank 10, and adjacent to the bathing tank 17, is a scoop wheel 20. As shown, the scoop wheel 20 is journaled to a shaft 21 which is rotatably supported between the opposed side walls 17C, 17D of the bathing tank 17. Circumferentially spaced about the periphery of the scoop wheel 20 are a plurality of scoops 20A arranged to scoop up the treating solution from the supply 15 and empty the same into the bathing tank 17 as the scoop wheel 20 is rotated. The drive for the scoop wheel 20 comprises a drive wheel 22 journaled to shaft 21 which is disposed in driving relationship to the raw stock material M being fed through the bathing tank 17.

To insure a positive friction drive between the raw stock material and the drive wheel 22, a means is provided for exerting a bias thereon. The biasing means comprises a cross shaft 23 which is yieldingly biased between the side walls of the bathing tank on a pair of opposed springs 24—24. Mounted on the cross shaft 23 is an idler roller 23A for maintaining the raw stock material M in positive friction driving relationship with the drive wheel 22 of the scoop wheel 20. The arrangement is such that the biasing means is rendered self adjusting to accommodate various sizes of raw stock material and/or to compensate for any imperfections therein. It will thus be apparent that the speed of rotation of the scoop wheel 20 is rendered proportional to the feed speed of the raw stock material M in a manner to insure that the level "L" of treating solution is maintained above the raw stock material M being fed through the bathing tank. In this manner, the raw stock material M is uniformly treated with the treating solution. In the event of any overflow of the bathing tank, the overflow is returned to the reservoir portion 14 of the holding tank. With the apparatus described, it will be apparent that the treating fluid is at all times confined to the reservoir portion 14 and thus prohibits any dripping of the solution onto the surrounding floor, thereby avoiding the hazard normally occurring in the vicinity of the processing machine or station.

To remove any excess of the treating solution as the raw stock material M exits from the bathing tank, a wiper means 25 is located in the wiper portion 16 of the holding tank 11. As shown, the wiper means 25 comprises a pair of spaced wiper blades 26, 27 disposed to either side of the raw stock material and supported within the holding tank by a suitable support bar 28. As shown, the wiper bars are adjustably mounted to one another by a pair of adjusting bolts 29 and associated wing nuts 30. A coil spring 31 is disposed about the adjusting bolts 29 between the respective wiper blades for yielding. The respective wiper blades 26, 27 are provided with complementary seats 26A, 27A to accommodate the shape of the raw stock material M being fed therethrough. By adjusting the tension on the wiper blades, the amount of treating solution required for coating the raw stock material prior to processing can be controlled. Any excess will fall to the bottom of the wiper portion 16 of the holding tank 11. If desired, the residue falling to the bottom of the wiper portion 16 may be drained through a drain opening 32 formed in the bottom of the wiper portion, and collected in a suitable catch drawer 33 slidably mounted therebelow, from which the residue may be periodically removed. A utility drawer 34 for storing various tools is disposed below the reservoir portion 14.

Mounting brackets 35 may be provided whereby the apparatus may be directly connected to the processing machine or station, or in the alternative, the apparatus may be mounted on its own stand 36 adjacent to the processing station.

In operation, the feed of the raw stock material M through the guides 18 and 19 of the respective tanks 11 and 17 drives the drive wheel 22 which in turn effects the rotation of the scoop wheel 20. The rotation of the scoop wheel 20 insures that the bathing tank is maintained constantly full with the treating solution. Thus, the raw stock material M being fed through the bathing tank is submerged in the treating fluid to insure the uniform and complete treatment or coating of the raw stock material M. The biasing means insures that a positive friction drive is maintained between the drive wheel 22 and the raw stock material M driving the same. The adjustable wiper blades 26, 27 function to remove any excess of the treating solution from the raw treated stock material M.

While the invention has been described as a cleaning and/or lubricating device, it will be understood that a plurality of apparatus 10, as described, may be placed in tandem to effect sequentially first a cleaning operation followed by a successive lubricating operation, and which may be followed by any other sequentially required operation to which the raw stock material M may be required to be treated by a treating solution prior to being processed.

As the invention has been described with respect to a particular embodiment thereof, it will be readily appreciated and understood that variations and modifications may be made without departing from the spirit or scope of the invention.

What is claimed is:

1. A mechanical solution applicating device for applying a treating solution to elongate raw stock, said device comprising
   a holding tank containing a supply of treating solution to be applied to the raw stock,
   a bathing tank supported within said holding tank,
   guide means formed in at least one opposed wall of each of said holding tank and bathing tank,
   said guide means being disposed in axial alignment for receiving the raw stock being fed through said holding tank and bathing tank,
   transfer means for effecting the transfer of treating solution from said holding tank to said bathing tank whereby the raw stock is coated with treating solution in said bathing tank as the raw stock is fed therethrough,
   and drive means responsive to the feeding of said raw stock and being operatively connected to said transfer means for driving said transfer means that effecting the transfer of treating solution from the holding tank to the bathing tank in accordance with the feeding speed of the raw stock material.

2. A mechanical solution applicating device as defined in claim 1 and including
   means imparting a biasing force on said raw stock to insure a positive frictional driving force between said drive means and the raw stock material.

3. A mechanical solution applicating device as defined in claim 1 and including wiper means disposed downstream of said holding tank to wipe any excess of said treating solution from the raw stock prior to being processed.

4. A mechanical solution applicating device as defined in claim 1 wherein said transfer means includes a scoop wheel having a plurality of circumferentially spaced scoops thereon for effecting the transfer of treating solution from said holding tank to said bathing tank as said scoop wheel rotates, a drive shaft being connected to said scoop wheel for supporting said scoop wheel for rotation within said holding tank, and said drive means including a drive wheel journaled on said drive shaft within said bathing tank, said drive wheel being disposed in frictional driving relationship with the raw stock being fed through said bathing tank so as to be driven thereby.

5. A mechanical solution applicating device as defined in claim 4 and including a biasing means for insuring a positive frictional driving force between said drive wheel and the raw stock material being fed through the bathing tank, said biasing means including an idler shaft movably journaled within said bathing tank, an idler roller journaled on said idler shaft so as to be disposed in engagement with the raw stock, and spring means exerting a bias and said idler shaft for maintaining the raw stock in positive driving relationship with said drive wheel.

6. A mechanical solution applicating device as defined in claim 3 wherein said wiper means includes adjustable wiper blades, said adjustable wiper blades being disposed to opposite sides of the raw stock, said adjustable wiper blades having complementary seats for receiving the raw stock material therebetween, and means for adjusting the respective wiper blades to control the amount of treating solution coating the raw stock.

7. A mechanical solution applicating device for applying a treating solution to elongate raw stock, said device comprising a holding tank, a partition extending transversely of said holding tank for dividing said tank into a reservoir portion for containing a supply of treating solution to be applied to the raw stock material and a wiping portion for effecting the removal of any excess treating solution from the treated raw stock, a bathing tank disposed within said reservoir portion, guide means formed on at least one opposed walls of each of said holding tank including said partition and said bathing tank, said guide means being disposed in alignment for receiving the raw stock material being fed therethrough, a transfer means comprising a scoop wheel rotatably journaled to rotate within the reservoir portion of said holding tank, a plurality of scoops circumferentially spaced about said scoop wheel on one side thereof, a drive shaft connected to said scoop wheel, a drive means for effecting the rotation of said drive shaft and said connected scoop wheel for driving said transfer means thereby effecting the transfer of treating solution from said reservoir portion to said bathing tank, said drive means including a driving wheel engaging the raw stock material in frictional driving relationship so that the rotation of said scoop wheel is proportional to the feed speed of the raw stock material being fed through said bathing tank, means for biasing the raw stock material toward said drive wheel to insure a positive frictional drive therebetween, wiper means disposed in said wiping portion to remove any excess of treating solution coating the raw stock material being fed through said bathing tank, said wiper means including a pair of wiper blades disposed to either side of the raw stock material, said pair of wiper blades having complementary seats conforming substantially to the shape of the raw stock material being fed therebetween, means for adjusting the pair of wiper blades so as to leave the desired amount of treating solution on the raw stock material being wiped thereby.

8. A mechanical solution applicating device as defined in claim 7 and including means defining a discharge opening in the bottom of said wiper portion, and a drawer slidably mounted below said discharge opening for receiving the residue removed from the raw stock material by said wiper means.

* * * * *